United States Patent [19]
Clary

[11] 3,884,527
[45] May 20, 1975

[54] CAST SPOKE WHEEL

[76] Inventor: Henry James Clary, 17825 S. Santa Fe Ave., Compton, Calif. 90221

[22] Filed: Feb. 4, 1974

[21] Appl. No.: 439,577

[52] U.S. Cl. ................................ 301/65; 301/64 R
[51] Int. Cl. ............................................. B60b 1/08
[58] Field of Search .......... 301/65, 66, 64 SD, 64 R, 301/64 SH, 73; D12/204, 205, 206

[56] References Cited
UNITED STATES PATENTS

| | | | |
|---|---|---|---|
| 3,549,205 | 12/1970 | Reid | 301/64 |
| 3,659,901 | 5/1972 | Porsche | 301/65 |

*Primary Examiner*—M. Henson Wood, Jr.
*Assistant Examiner*—Reinhard J. Eisenzopf
*Attorney, Agent, or Firm*—Georges A. Maxwell

[57] ABSTRACT

A cast metal automobile wheel with axially disposed front and rear ends, a central, axially extending, cylindrical hub with a flat radially extending flange at the rear portion defining a radially outwardly disposed cylindrical edge and a radially extending intermediate section simulating a pattern of crossing wire spokes and including a plurality of circumferentially spaced, radially outwardly convergent primary bars between the hub and the rim, across said flange with their mean radial plane intersecting the axis of the wheel and converging at the rim, said bars being greater in axial extent than in radial extent with radially extending axially disposed inner edges and radially inwardly and axially forwardly inclined outer edges and pairs of angularly secondary bars between each adjacent pair of primary bars with and extending between the edge of the flange and the rim, the radial inner ends of the secondary bars joining the corners established by the flange edge and related primary bars at angles substantially bisecting said corners whereby forces resolved by and between the flange and primary bars are transmitted substantially longitudinally through the secondary bars between the rim and said corners, said secondary bars being less in axial extent than the primary bars with rear edges on a common plane with the rear edges of the primary bars and with radially extending front edges on a plane spaced axially rearwardly from the front edges of the primary bars.

10 Claims, 3 Drawing Figures

PATENTED MAY 20 1975

3,884,527

CAST SPOKE WHEEL

This invention has to do with an improved cast metal wheel structure with a simulated spoke pattern.

In recent years there has developed an ever increasing demand for special wheels for automobiles, that is, wheels which are distinctive from those wheels provided with automobiles as original equipment. Such wheels are utilized to personalize or customize the automobile with which they are related and in addition to providing functional advantages, are decorative in nature.

At present, special or custom wheels of the character referred to above are cast of magnesium or, more commonly, of alluminum alloy. In some instances, the wheels are one piece structures while in other instances they are fabricated structures including an outer, steel rim section and an inner, cast alluminum, disc and hub section.

The structural or functional advantages sought to be attained in or with custom wheels of the character referred to above are, first, a reduction of weight as compared with standard all steel wheels; second, through the wheel ventilation for cooling related braking mechanisms and provided for by air conducting apertures in the wheels; and third, the elimination of decorative hub caps, which is made possible by embellishing the custom wheels with ornamental and/or decorative features.

At this time, there is a trend toward, and a growing demand for, cast metal custom wheels, the intermediate portions of which occurring between the central hubs and outer rim portions of the wheels, are embellished with a wire spoke design, that is, with a design that simulates the pattern of thin, angularly related, crossing wire spokes.

Due to the relative low resiliency, low flexibility and brittleness of cast alluminum, due to inherent and practical limitations in the manufacturing procedures and techniques employed in the manufacture of cast alluminum wheels, and due to the structural stability and strength required to be embodied in such wheels, the ability to effectively establish patterns which simulate wire spokes in such wheels, is materially restricted.

To date, all attempts to establish simulated wire spoke patterns in cast wheel structures have involved the establishing of an open grate-like pattern in the intermediate portions of the wheels. The gratelike patterns are made up of a plurality of straight, intersecting bar-like portions, angularly related with each other and relative to the axis of the wheels to define diamond, triangular and/or pentagonal openings through the wheels and to impart the desired air circulating capabilities in the wheels. The noted bar portions in such gratings are established at minimal lateral extent or width so that their axially outwardly disposed edges which occur on a single plane or common surface of the wheel are rather thin. The noted bar portions of such gratings are of considerable depth (axial extent with respect to the axis of the wheel) and are characterized by axially outwardly convergent, flat sides. Convergency of the sides affords necessary draft to effect casting of the wheels and serves to increase the cross-sectional extent and resulting strength of the bar portions.

While the above noted practices have resulted in wheels, the designs of which are suggestive of the design of wire spoke wheels, the results have been less than satisfactory. Such wheels, from a design standpoint, have been wanting in that the width or lateral extent of the spoke-like portions must be excessively wide and/or the number of spokes must be excessive. Further, all of the exposed, spoke simulating surfaces occur on a common surface or plane of the wheels. The above noted excesses are brought about by the structural and strength requirement of such wheels. That is, the spoke simulating parts and/or portions must be made sufficiently thick, heavy and numerous so that the resulting wheels will withstand the operating conditions for which they are intended.

An adverse effect found in such wheels is the excessive reduction in the size of the openings established in the intermediate portions thereof, which openings are provided for and intended to freely conduct air through the wheel structures for cooling of related braking means.

A principal or major problem confronted in establishing wheels of the character referred to above resides in the fact that the obtuse and acute corners defined by the intersecting bar-like portions of the gratings create or establish stress risers, that is, areas where forces exerted through the structures resolve or accumulate.

These stress risers, while they might occur where a greater than average amount of stock occurs are nonetheless weak points or areas and are those points or areas where the structures fail or break apart when subjected to forces beyond design limits. To compensate for the stress risers established in and by the corners in simulated wire spoke patterns in cast wheels the prior art has simply resorted to increasing the cross-sectional size or extent of the bar-like portions of the grate-like structures. This has resulted in substantial loss of the desired aesthetic effect, an increase in weight (and resulting cost) of the wheels and a material reduction of the air circulating capacity of the wheels.

An object and feature of my invention is to provide a cast alluminum wheel having a grate-like intermediate portion simulating a wire-spoke pattern comprising primary and secondary intersecting bar portions which are less in cross-sectional extent and/or number than is required in cast wheels with wire spoke simulating grate-like portions provided by the prior art.

It is another object and feature of my invention to provide a wheel structure of the character referred to which is such that a wheel of desired strength and stability can be established with less material and is lighter than similar wheels provided in accordance with the teaching of the prior art.

A further object and feature of my invention is to provide a structure of the character referred to above wherein the air circulating capacity of the wheel is not unduly and/or adversely restricted.

Yet another object and feature of the present invention is to provide a wheel structure of the character referred to wherein the stress risers at the corners established by the intersecting primary bar portions of the grating are compensated for by related secondary bar portions which function to reinforce the primary bar portions and to conduct and direct forces exerted through the primary bar-portions away from said stress risers.

It is yet another object and feature of my invention to provide a structure of the character referred to wherein the secondary bar-portions are recessed axially inwardly relative to the primary bar portions, are crossed and angularly related with each other and with the primary bar portions to simulate wire spokes on a plane spaced axially from the plane on which the spokes simulated by the primary bar portions appear to occur. It is an object and feature of the instant invention to provide a wheel structure of the character referred to wherein the primary bar portions are established in number, disposition and size whereby the desired simulated wire spoke design or pattern can be most effectively established at the axial outer plane of the pattern and which includes axially inwardly spaced or recessed truss-like or gusseting secondary bar portion that reinforce the primary bar portions and compensate for structural inadequacies embodied into the primary bar portions for aesthetic reasons. Said secondary bars simulate wire spokes on plane spaced axially inwardly from the axial outer plane of the pattern.

The foregoing and other objects and features of my invention will be fully understood from the following detailed description of a typical preferred form and embodiment of my invention throughout which description reference is made to the accompanying drawing, in which.

The wheel of the present invention is, in the form of the invention illustrated, a unitary, cylindrical cast metal structure with axially inwardly and outwardly disposed front and rear ends 10 and 11. In the preferred carrying out of the invention, the wheel is cast of a suitable alluminum alloy, though in practice it can be established of magnesium or other suitable metal or alloy without departing from the spirit of the invention.

The wheel is characterized by a central hub portion H, an outer cylindrical rim portion R concentric with and spacedly surrounding the hub portion H and an intermediate substantially radially extending disc portion D extending between the hub and rim portions.

The rim portion R is shown as being formed to cooperatively engage and carry or support a pneumatic tire.

In practice, if desired, the wheel can be made in two pieces, that is, the rim portion can be a separate annular part established of steel, formed to engage and mount a pneumatic tire and suitably mechanically engaged with and fixed to the outer cylindrical portion of a central cast metal part of the wheel structure defining the hub and intermediate disc portions thereof. Such a modified form of the invention would in no way alter or affect the novelty and spirit of this invention and is but one modification or structural variation of wheel construction, utilizing cast metal, commonly provided by in the prior art.

In accordance with the above, when reference is herein made to the rim portion R of the instant wheel, it is to be understood that the referred to portion of the wheel can be a separate part or an integral portion of the wheel, as desired or as circumstances may require.

The hub portion H includes a central, apertured sleeve portion 12 and an outer mounting flange portion 13 projecting radially from the central sleeve portion. The sleeve portion 12 is adapted to freely accommodate an axially outwardly projecting end part such as a wheel bearing housing of related wheel mounting means (not shown) on a related automobile structure. The flange portion 13 is adapted to be arranged in substantially flat bearing engagement with a radially extending part of the wheel mounting means, such as a brake drum and is provided with a set of circumferentially spaced axially extending openings 14 to accommodate axially outwardly projecting studs on said radially extending part. The flange portion is held in engagement with the wheel mounting means by nuts advanced on the outer ends of the studs and into engagement with said flange portion.

Figure 1:
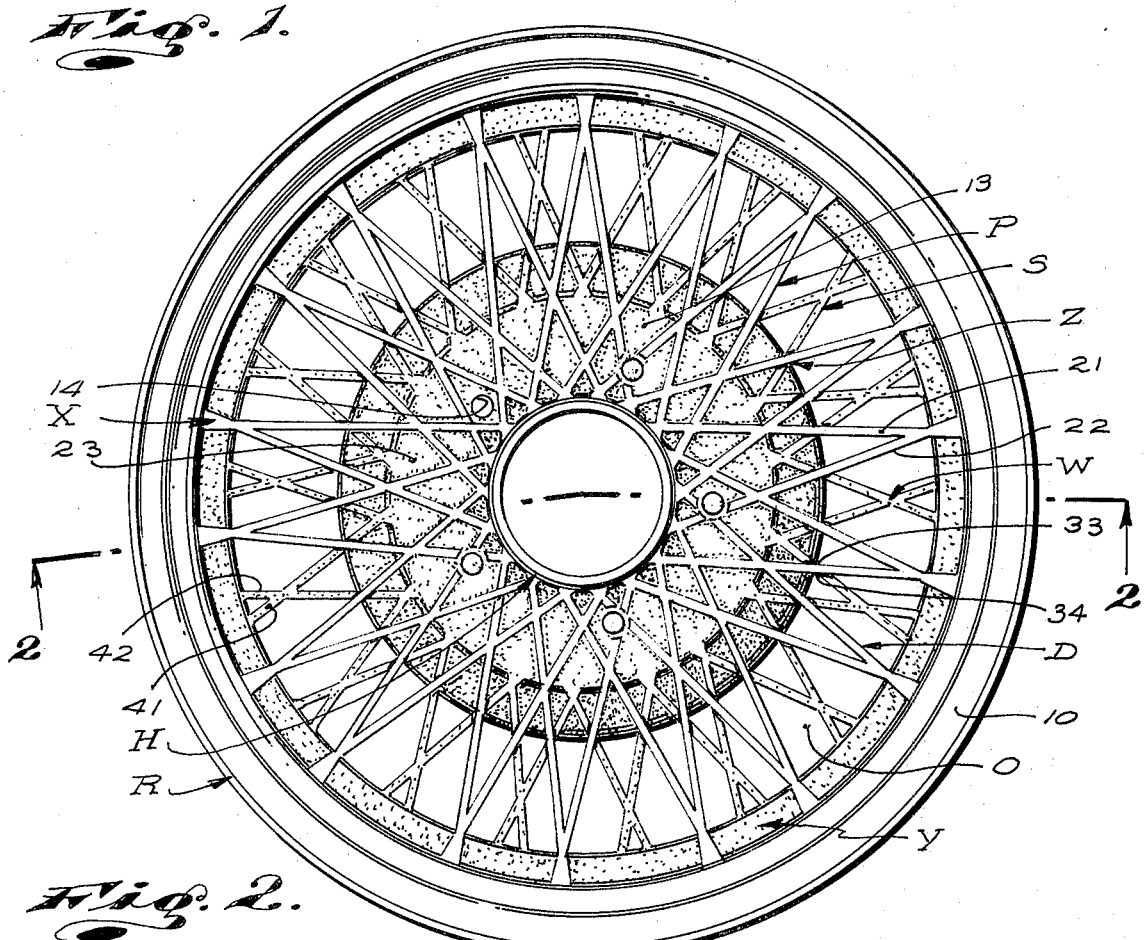
FIG. 1 is an axial, front, plane view of my new wheel.
Figure 2:
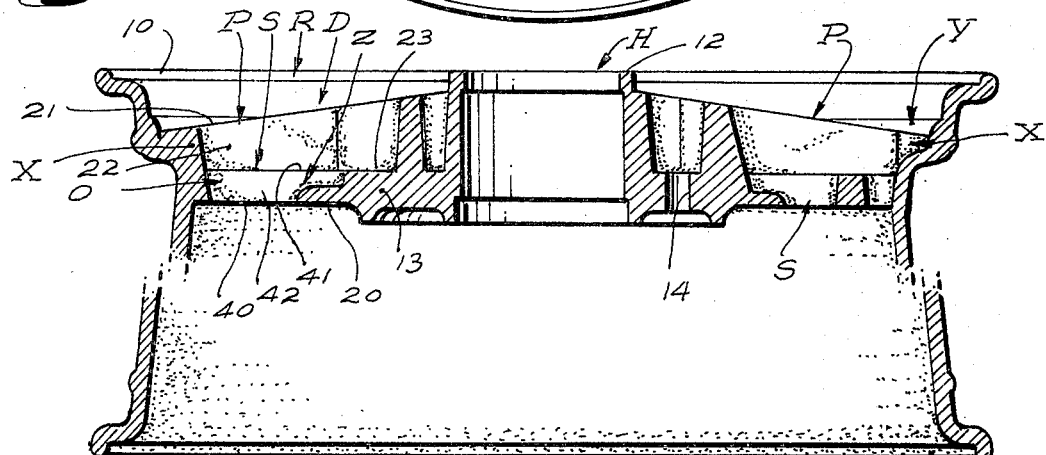
FIG. 2 is a sectional view taken as indicated by line 2—2 in FIG. 1.

The sleeve portion 12 is greater in axial extent and projects axially outward from the flange portion, as clearly illustrated in FIG. 2 of the drawings.

The intermediate, radially extending disc portion D of the invention is an apertured grating joined integrally with and extending radially of and between the hub portion H and rim portion R. The grating is composed of a plurality of circumferentially spaced pairs of elongate, straight, angularly related, intersecting primary bar portions P extending from the sleeve portion of the hub to the rim portion and circumferentially spaced pairs of elongate, straight angularly related, intersecting secondary bar portions S extending from the flange portion of the hub to the rim portion.

Figure 3:
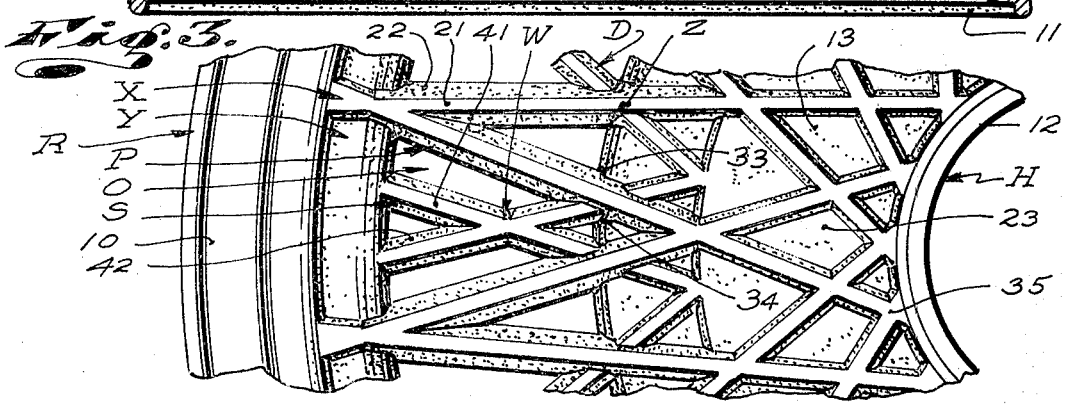
FIG. 3 is an enlarged view of a portion of the structure, shown in FIG. 1.

The elongate primary bar portions are substantially rectangular in cross-section, being substantially greater in axial extent or depth, (with respect to the axis of the wheel) than in lateral extent and are characterized by flat, axially, inwardly disposed inner edges 20, flat, substantially radially outwardly and axially forwardly inclined outer edges 21 and substantially flat oppositely disposed sides 22. The sides 22 are on axially forwardly convergent planes so as to provide necessary draft and enable the satisfactory casting of the structure, as shown in FIG. 3 of the drawings.

The primary bar portions are greater in depth or axial extent than the flange 13 of the hub portion H of the wheel and are axially arranged so that their radial inner portions extend across and project axially forwardly from the forward surface 23 of the flange.

The radial inner ends of the primary bars P stop at and are integrally joined with the exterior and radial surface of the hub sleeve 12. The portions of the primary bars adjacent the surface 23 of the hub flange can be considered to be in the nature of reinforcing ribs on said flange or the flange can be considered as a reinforcing plate-like structure integrally joined with and extending between the inner portions of the primary bars.

The longitudinal axes of the primary bars of each pair of primary bars are angularly related on radially outwardly convergent axes or planes and are so arranged that they extend freely outward from the hub portion H to converge one with the other adjacent to the rim portion R with which they are integrally joined.

The bars P of each pair of bars preferably converge with each other to occur in integral, substantially side by side relationship where they join the rim portion R, as shown at X and so that the amount of stock presented at that area of joinder is substantially greater than the stock which would be presented by joinder of but one bar with the rim and so that the related, converging bars lend structural support, one to the other. In the case illustrated, the converging outer ends of the bars P are extended outwardly in what appears to be crossing relationship in a relieved portion Y of the rim portion, for aesthetic purposes.

The stress rise effect afforded by the three corners defined by the intersection of the bars P, of each pair of bars, with the rim R, as at X, is substantially less than the cumulative stress rise that would be created if the subject bars were spaced circumferentially so as to join the rim R independently.

The portions of the bars P, of each pair of bars P, which join the outer periphery of the hub flange, as at Z, are spaced apart circumferentially of the hub flange and afford no support, one to the other. Each bar establishes an acute inside corner 33 and an obtuse outside corner 34. The stress riser created at the points of joinder Z is substantial and establishes weak points or areas in the wheel construction.

It is to be particularly noted that in the normal operation and use of the wheel, it rotates about its central axis and transmits torsional forces between the hub and rim portions H and R, which forces are resolved as circumferentially directed shearing forces at the areas or points of joinder X and Z, where the bars P join the rim and the hub. The points of joinder Z being spaced radially inwardly from the points of joinder X and being closer to the central axis of hub of the wheel are, as a result of the lever arm effect of the wheel structure, subjected to considerably greater shearing forces than are the outer points of joinder X. Accordingly, the areas or points of joinder Z, where the bars P join the hub flange 13 are subjected to greater forces and must be stronger than the areas or points of joinder X where the bars P join the rim R.

As previously noted, inner end portions of the bars P of each pair of bars P, extending across the outer surface of the hub flange 13, are in the nature of reinforcing ribs on the flange and join the outer periphery of the sleeve portion of the hub as at 35. In the preferred carrying out of my invention the said inner portions of the bars P of adjacent pairs of bars P intersect and cross each other as they extend from the outer periphery of the hub flange to the hub sleeve and are so arranged and angularly related that the inner portion of the bars at one side of each pair of bars intersects and crosses the inner portions of the bars P at the other side of the next two adjacent pairs of bars P and joins the bar P of the third removed pair of bars at the sleeve portion of the hub H whereby the criss-cross pattern of wire wheel spokes is effectively simulated at the outer surface of the disc portion D, across the hub flange 13 and between the hub sleeve 12 and rim portion R.

While the instant invention is primarily concerned with the outer portions of the bars P which extend freely between the rim portion R and hub flange 13 of the wheel, the inner portions of the bars P extending across the flange 13 are of structural and functional significance as well as of aesthetic significance since they reinforce the flange and make it possible to reduce the axial thickness and weight of the flange, thereby conserving of material, reducing cost and attaining the sought after overall reduction of weight.

At this point, it is important to note that if only the primary bars P were to be provided, the cross-sectional extent of the freely extending portions of the bars would have to be made sufficiently great to impart necessary and required strength into the wheel structure, particularly at those areas or those points of joinder Z where the bars P join the hub flange 13 and rim and to compensate for the stress rise established at the areas X, between the bars P and rim R and at the areas Z between said bars and the hub flange 13. The size or cross-sectional extent of the noted freely extending outer portions of the bars P must be continued into and throughout the inner portions thereof, adjacent the flange 13 in order to maintain the sought after aesthetic effect. If only the bars P were provided, the lateral extent of those bars would have to be increased to such an extent that the desired, thin, delicate wire effect would be adversely affected or lost and the size or extent of the apertures O defined by the bars would be materially reduced, unduly restricting the air conducting or air circulating capacity of the wheel, which is a major capability sought to be attained in such wheels.

In accordance with the present invention, the outer freely extending portions of the bars P are established in accordance with aesthetic requirements and, by themselves, may be weak and of insufficient strength to afford the wheel with required and necessary strength at the areas or points of joinder Z where the bars P join the hub flange 13, to withstand anticipated operating conditions.

In accordance with the present invention and in order to compensate for the weakness built into the outer free portion of the primary bars P, without enlarging the size of the bars P to an extent which would destroy the sought after aesthetics, the secondary bars S are provided to occur between the outer free portions of the bars P to reinforce and support the bars P.

At this point, it is extremely important to note that the size or extent of the secondary bars S is variable, with little effect upon the aesthetics of the wheel. The size or extent of the bars S is dictated by the strength afforded to the wheel by the related portions of the bars P and is adjusted so as to reinforce the bars P and to impart into their related portions of the wheel structure that stability and strength which is required.

It is also important to note that by appropriately relating the bars P and S so that they coact relative to each other, the size and extent of the bars S can be maintained at a minimum whereby quantity of material and resulting cost is maintained low, the air conducting or circulating capacity of the wheel is maintained high and the overall weight of the wheel is maintained at a minimum.

The secondary bars S are provided in pairs and the pair of bars S are arranged and occur between the outer free portions of adjacent pairs of the bars P. The bars S of each pair of bars S are angularly related with each other and are arranged relative to their related bars P to extend between the outer periphery of the hub flange 13 and the inner periphery of the rim portion R. The inner ends of the bars S extend into the outside and obtuse corners 34 established by the hub flange 13 and the bars P, with which they are related to integrally join therewith and so that the said ends of the bars serve to gusset the corner 34, reducing the stress rise presented thereby. The bars S support and reinforce the weaker or weakest points or areas of joinder Z in the wheel, where the bars P join the hub flange 13.

Since cast alluminum is weak in tension and shear and is strongest in compression, the bars S are related and disposed so that they are primarily subjected to compressive forces when the wheels are in use. The principal forces encountered in the wheel when in use are directed circumferentially of the wheel and are resolved at the several noted areas of joinders X and Z established by the primary bars P at the rim R and hub flange 13. By extending and joining inner ends of the bars S and with the outside corners 34 established by bars P and the hub flange 13 and by arranging and disposing the bars S so that they substantially bisect the angle of the corners 34, it will be apparent that they are aligned to receive the resolved forces at the corners 34 and conduct said forces in compression and in tension, to and from the rim portion R, thereby affording great stability and reinforcement to their related portions of the bars P.

Some latitude, with respect to the angular dispositioning of the bars S relative to the corners 34, can be afforded for aesthetic reasons and as a result of which the bisecting of corner angles need not be strictly adhered to, but is simply approximated.

While in some instances it might be desirable that both ends of the bars S join in corners established by the bars P, as at points X and Z, such a relationship is not ordinarily necessary as structural support afforded by the bars S is sufficient to provide necessary added strength when at least one end of each bar S is arranged and disposed to receive and transmit resolved forces from related corners established by primary bars P, axially and between the hub and rim portions of the wheel.

In the case illustrated, the bars S of each set of bars S extend from their related corners 34 to the rim R at points between and spaced circumferentially from the points of joinder X between the rim R and the adjacent related pairs of bars P. Further, due to the angular relationship of the bars S with respect to the angle of their related corners 34, the bars S cross each other between their ends, as at W, within the openings O across which they extend and as clearly illustrated in the drawings. The corners established about the points of joinder W and at the ends of the pairs of secondary bars S establish stress risers which structural deficiencies are to a great extent compensated for by varying the angular dispositing and cross-sectional extent of the bars S. In practice, the requirements of the bars S, that is, the amount of support and added strength they are required to lend to the remainder of the structure is such that if they are substantially equal in lateral extent with the bars P (for aesthetic balance) and are substantially equal in axial extent or depth with the flange F, they afford greater added strength and support than is required and the stress rise effects established in connection therewith is negligible negligible need not be considered.

The bars S have straight radially extending axially disposed inner and outer edges 40 and 41 and flat opposite sides 42 which are on axially outwardly convergent inclined plane to provide draft (for casting). The inner edges 40 of bars S occur in a common plane with the inner edges 20 of the bars P, while the outer edges 41 of the bars S are spaced axially inward from the radially inwardly and axially outwardly inclined edges 21 of the bars P. Accordingly, the edges 41 of the bars S and the edges 21 of the bars P occur on axially spaced planes which are radially outwardly convergent relative to each other.

As a result of the above, the bars S create an aesthetic impression of a secondary annular series of wire spokes spaced axially inward of the primary outer spoke pattern established by the bars P and while intended as reinforcing structure for the bars P, they aesthetically enhance the design and create a more realistic wire spoke pattern.

While close examination of the wheel may disclose that the angular disposition of the bars S (established in accordance with structural considerations) is totally imcompatible with the angular disposition of the bars P, from the standpoint of a true wire wheel spoke design or pattern, it is notable that the discrepancy, upon casual observation, is not readily discernible and that the bars S do and in fact enhance the overall, sought after, simulated spoke design.

Having described only a typical preferred form and application of my invention, I do not wish to be limited to the specific details herein set forth, but wish to reserve to myself any modifications and/or variations which may appear to those skilled in the art and which fall within the scope of the following claims:

Having described my invention, I claim:

1. A unitary cast metal wheel comprising a central, axially extending cylindrical sleeve with axially disposed front and rear ends and a substantially flat flange with a cylindrical outer edge extending radially from the sleeve and defining a hub portion of the wheel, an annular rim portion with a radially inwardly disposed inner edge concentric with and surrounding the hub portion in radial spaced relationship and an annular, radially extending intermediate portion between the hub and rim portions, said intermediate portion comprising a plurality of circumferentially spaced elongate primary bars extending between the hub and rim portions on chord axes and defining an annular series of air conducting openings, said primary bars being substantially rectangular in cross-section with thin, substantially axially disposed front and rear edges and flat sides, said primary bars being of limited cross-sectional extent and affording limited structural stability and strength between the hub and rim portions and defining substantially axially extending stress rise corners where they join the hub and rim portions, a plurality of elongate, circumferentially spaced secondary bars extending between the hub and rim portions and arranged to extend circumferentially and radially across said openings on chord axes angularly related to the axes of adjacent primary bars and substantially intersecting at least one of the stress rise corners established by related primary bars to gusset said corners and to conduct resolved forces at said corners substantially longitudinally of said secondary bars between the hub and rim portions, said secondary bars being substantially rectangular in cross-section with thin, substantially axially disposed front and rear edges and flat sides, the cross-sectional extent of the secondary bars being limited to impart sufficient added strength to the wheel whereby the cumulative strength afforded by the primary and secondary bars affords desired strength to the intermediate portion and between the hub and rim portions of the wheel.

2. A wheel structure as set forth in claim 1 wherein the primary bars are arranged in circumferentially spaced pairs, the longitudinal axes of the primary bars of each pair of bars being angularly related and converging redially outwardly at an acute angle adjacent to the rim, the acute inwardly disposed corners established by the pairs of primary bars being bisected by the mean radial plane of the pairs of primary bars, the secondary bars are arranged to extend across the openings established between the adjacent pairs or primary bars.

3. A wheel structure as set forth in claim 2 wherein the outer ends of the primary bars of each pair of primary bars converge and cross at a point spaced radially inward from the rim portion a distance substantially equal to twice the lateral extent of said bars whereby the outer end portions of said primary bars define one inside, acute angle corner of high stress rise and four outside obtuse angle corners of low stress rise where they cross and join the rim portion.

4. A wheel structure as set forth in claim 3 wherein said secondary bars are less in axial extent than the primary bars and are arranged with their rear edges in a substantially common plane with the rear edges of the primary bars and their front edges on a plane spaced axially rearwardly from the plane on which the front edges of the primary bars occur.

5. A wheel structure as set forth in claim 2 wherein said secondary bars are less in axial extent than the primary bars and are arranged with their rear edges in a substantially common plane with the rear edges of the primary bars and their front edges on a plane spaced axially rearwardly from the plane on which the front edges of the primary bars occur.

6. A wheel structure as set forth in claim 1 wherein the primary bars are arranged in circumferentially spaced pairs, the longitudinal axes of the primary bars of each pair of bars being angularly related and converging radially outwardly at an acute angle adjacent to the rim, the acute inwardly disposed corners established by the pairs of primary bars being bisected by the mean radial plane of the pairs of primary bars, the secondary bars are arranged in circumferentially spaced pairs and extend across the openings established between the adjacent pairs of primary bars, the secondary bars of each pair of secondary bars are arranged with their longitudinal axes angularly related with each other and with the two adjacent primary bars whereby an end of each of said secondary bars joins a corner defined by an end of one of said two primary bars.

7. A wheel structure as set forth in claim 1 wherein the primary bars are arranged in circumferentially spaced pairs, the longitudinal axes of the primary bars of each pair of bars being angularly related and converging radially outwardly at an acute angle adjacent to the rim, the acute inwardly disposed corners established by the pairs of primary bars being bisected by the mean radial plane of the pairs of primary bars, the secondary bars are arranged in circumferentially spaced pairs and extend across the openings established between adjacent pairs of primary bars, the secondary bars of each pair of secondary bars are arranged with their longitudinal axes angularly related with each other to converge radially outwardly toward the rim portion, the inner end of each secondary bar joins a corner defined by the inner end of one of said two primary bars and the hub portion and extends outwardly therefrom on an axis substantially radially outwardly divergent relative to the axis of said one primary bar.

8. A wheel structure as set forth in claim 7 wherein the secondary bars of each pair of secondary bars cross in the openings at points spaced radially inwardly of the rim portion and join the rim at circumferentially spaced points from each other and from the outer ends of said adjacent primary bars.

9. A wheel structure as set forth in claim 8 wherein the outer ends of the primary bars of each pair of primary bars converge and cross at a point spaced radially inwardly from the rim portion a distance substantially equal to twice the lateral extent of said bars whereby the outer end portions of said primary bars define one inside, acute angle corner of high stress rise and four outside obtuse angle corners of low stress rise where they cross and join the rim portion.

10. A wheel structure as set forth in claim 1 wherein said secondary bars are less in front to rear edge cross-sectional axial extent than the primary bars and are arranged with their rear edges in a substantially common plane with the rear edges of the primary bars and their front edges on a plane spaced axially rearwardly from the plane on which the front edges of the primary bars occur.

* * * * *